July 22, 1958 J. CARDON ET AL 2,844,714

RADIO RECEIVER MUTING CONTROL CIRCUIT

Filed Dec. 30, 1955

INVENTORS
JULES CARDON
FREDERICK G. RICHTER
BY Mitchell & Bechert
ATTORNEYS

United States Patent Office 2,844,714

Patented July 22, 1958

2,844,714

RADIO RECEIVER MUTING CONTROL CIRCUIT

Jules Cardon, Garden City, and Frederick G. Richter, Woodside, N. Y., assignors to Servo Corporation of America, New Hyde Park, N. Y., a corporation of New York Application December 30, 1955, Serial No. 556,674

3 Claims. (Cl. 250—20)

Our invention relates to an improved automatic monitoring aid for a radio receiver.

When using a receiver tuned to a given frequency to monitor said frequency, it is a source of constant strain and wasted energy to listen to a background noise representing signals at less than adequate carrier level. Also, in two-way radio communication, it is particularly undesirable to listen to background noise over a channel that is instantaneously not being used. In the past, these difficulties have been recognized, and circuits responsive to low or inadequate carrier levels have been employed to reduce the audio-frequency level delivered to the loud speaker; however, these circuits have had the undesirable feature of variously affecting the audio output to the loud speaker for various carrier levels and are not characterized by crisp on-off action at a particular threshold level.

It is, accordingly, an object of the invention to provide an improved automatically operated control circuit for avoiding the above-noted difficulties.

It is another object to provide an automatic circuit of the character indicated in which there may not only be crisp on-off control of the audio output to the loud speaker for carrier signals above or below threshold, but in which an unambiguous threshold may be simply selected.

It is still another object to meet the above objects with a circuit arrangement in which on-off control is effected under constant-current conditions, so that occurrence of a control function may not be reflected into the power supply, even if the power supply is unregulated; thus, it is an object to maintain adjusted levels of operation of the radio-frequency and itnermediate-frequency circuits that may be supplied by the same power supply, regardless of switching functions in our control circuit.

Figure 1:
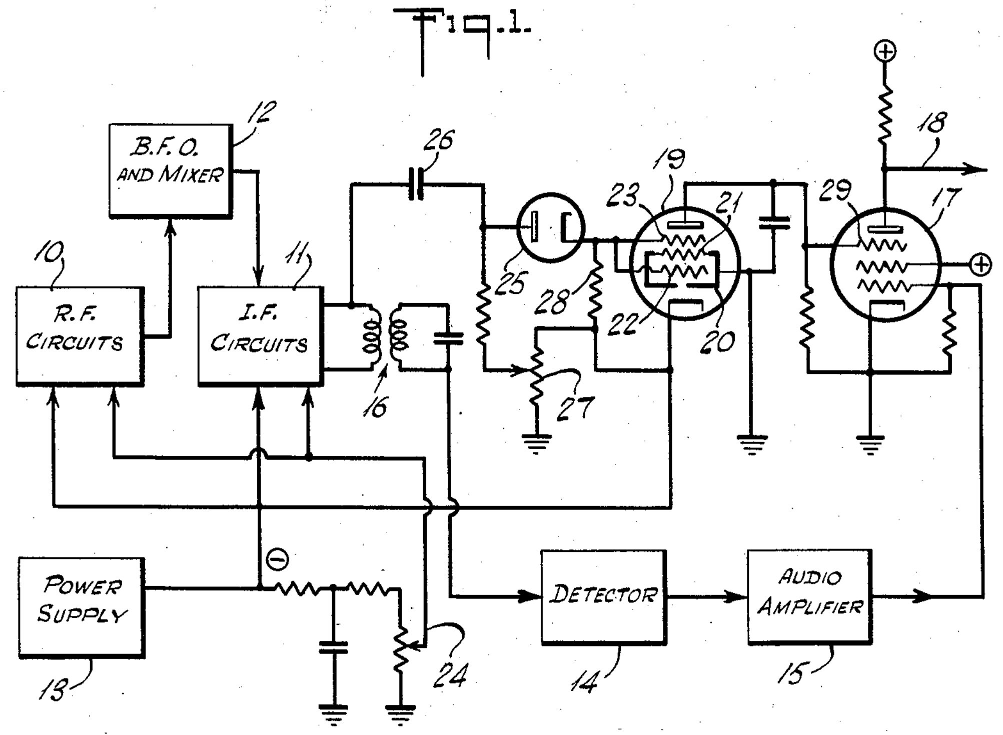
Figure 2:
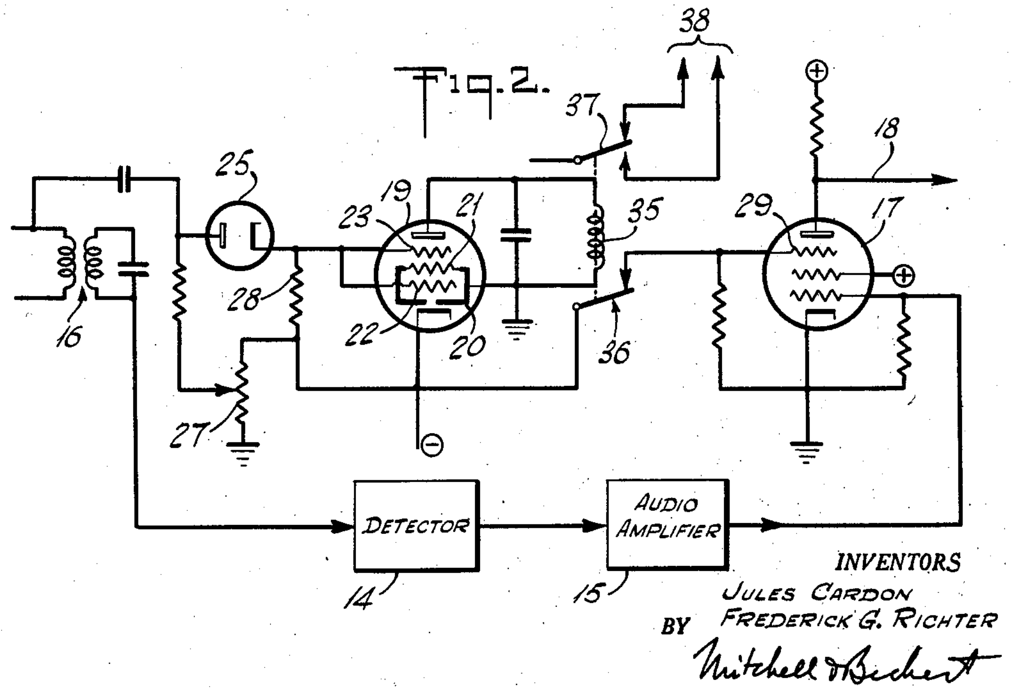

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 1 is an electrical circuit diagram schematically showing a radio receiver with a control circuit of our invention; and Fig. 2 is a similar, but fragmentary, diagram showing a modification.

Briefly stated, our invention contemplates specific employment of a so-called gate-beam pentode in conjunction with a rectifier to develop a step-function switching action in response to a detected intermediate-frequency signal level above or below a preselected threshold. The gated-beam pentode characteristically draws constant current whether the output circuit is or is not conducting, and we so couple the control and suppressor grids of the gated-beam pentode to the intermediate-frequency signal that crisp on-off operation is achieved. In order to further enhance the crispness of controlled admission of the audio signal to the loud speaker, we employ a sharp cut-off pentode as a gate, the control grid thereof being supplied by the audio circuit, and the suppressor grid receiving the on-off control function from the gated-beam pentode. The biasing of the gated-beam pentode is such as to produce conduction in the absence of sufficient carrier level in the intermediate-frequency signal; however, upon detection of a carrier level at or above threshold, instantaneous change of state (cut-off) is achieved in the gated-beam pentode, thus rendering the gate tube conductive and passing the audio signal to the loud speaker. As soon as the carrier drops below threshold, the gated-beam pentode instantaneously conducts and cuts-off the gating pentode. In one form to be described, the coupling between the two pentodes is direct, and in the other form the coupling is through a relay.

Referring to Fig. 1 of the drawings, our invention is shown in application to a radio receiver including radio-frequency circuits 10 and intermediate-frequency circuits 11, coupled by a beat-frequency oscillator and mixer 12. The B-supply for the radio-frequency circuits and for the intermediate-frequency circuits is derived from a single power supply 13 and, in the form shown, is applied to the negative side of the circuits involved. Intermediate-frequency output is delivered to an audio detector 14 and amplifier 15 by way of a coupling transformer 16, and gating means 17 connects the audio circuits to an output line 18, leading to a loud speaker or other monitoring device (not shown); gating means 17 is preferably a sharp cut-off pentode with a gating type of suppressor, such as the type designated 6AS6.

In accordance with our invention, we employ a so-called gated-beam pentode 19 as the principal means by which the gate 17 is operated in response to detected intermediate-frequency carrier levels above and below threshold, and we have found extremely desirable results to be achieved when the pentode 19 is of the type known in the trade as 6BN6. Thus, the pentode 19 may comprise a shield 20 connected to the screen grid 21 and fully surrounding the control grid 22; shield 20 and screen 21 are shown grounded. The shield 20 has an aperture adjacent the cathode, and whether the anode circuit is conducting or not, constant current will be drawn in the cathode circuit. For crisp action, the control grid 22 and the suppressor grid 23 are interconnected. These grids serve only to determine whether the constant-current beam emitted by the cathode is to be accommodated solely by way of the shield 20 to ground (cut-off conditions) or is to be passed through the aperture in the shield 20 to the anode (anode circuit conducting); in either event, as indicated above, the current drawn by the cathode circuit of tube 19 remains constant. In the form shown, the tube 19 derives its B-supply through the cathode circuit and may thus be connected to the power supply 13, in common with the radio-frequency and intermediate-frequency circuits. Bias supplies for the various input circuits within the radio-frequency and intermediate-frequency stages 10—11 are also derived from the power supply 13, as at connection 24.

The carrier signal which determines operation of the gated-beam pentode 19 may be detected through diode rectifier means 25, directly coupled to the grids 22—23, and coupled through a capacitor 26 to the output of the intermediate-frequency stage 11. A variable resistor 27 provides a means of selecting the carrier level at which the tube 19 will change its operating state. In the absence of a carrier level of threshold magnitude, the bias voltage developed by diode 25 across resistor 28 is insufficient to cut-off tube 19, so that tube 19 continuously conducts through the anode circuit to develop a strong negative potential (cut-off) at the suppressor 29 of the gating pentode 17. Under these circumstances, therefore, the audio output from amplifier 15 is not passed to the output line 18. However, when the carrier level reaches the threshold established by the setting of resistor 27, there will be developed across bias resistor 28 a cut-off potential, instantaneously switching off the gated-beam pentode 19 (insofar as the anode circuit is concerned) and crisply opening the gate 17 for passage of the audio signal into the output line 18.

In Fig. 2, we show a modification employing parts similar to those shown in Fig. 1 and therefore, where applicable, similar reference numerals are employed. The difference between the circuits is in the manner of coupling the gated-beam pentode 19 to the gating pentode 17; in Fig. 2, a relay having a winding 35 and contacts 36 establishes the coupling. The winding 35 is shown connected across the anode and the shield 20 of tube 19, and as long as tube 19 conducts (meaning insufficient carrier level), winding 35 will hold closed the contacts 36 so as to apply a strong negative potential to the suppressor grid 29 of the gate and thus prevent delivery of an audio output signal in the line 18. When the detected carrier level develops a cut-off potential across resistor 28, winding 35 is deenergized, and the relay contacts 36 may open, so as to restore conduction in the gate 17, and to pass the audio signal to the loud speaker. If desired, the relay may include an additional arm 37, with output connections 38 controlled thereby, to serve auxiliary functions as, for example, to display a lamp or alarm or other warning device when the carrier level is above or below threshold, as desired for particular applications.

It will be seen that we have described a relatively simple and effective control circuit for reliably eliminating audio-frequency output whenever the carrier level is inadequate. With our particular arrangement of control elements, exceedingly crisp on-off control is realized with respect to a preselected threshold level. This control is realized without any transient reflection in the operation of the radio-frequency and intermediate-frequency circuits, even if these circuits are all excited by the same B-supply. There is no noticeable fluctuation in step-function control point for any selected adjustment at 27, and, in the relay-operated arrangement of Fig. 2, no relay "chatter" is found to occur.

While we have described the invention in detail for the preferred forms illustrated, it will be understood that modifications may be made within the scope of the invention as defined in the claims which follow.

We claim:

1. In a radio receiver, radio-frequency circuits, intermediate-frequency circuits, audio-frequency detector means coupled to said intermediate-frequency circuits, gating means having a control-input connection and connected to the output of said audio detector, whereby said gating means will deliver an audio output depending upon the control effected at said control-input connection, and control means for said control-input connection comprising a gated-beam pentode having an output connected to said control-input connection, means interconnecting the control and suppressor grids of said pentode and coupling the same to said intermediate-frequency circuit, said last-defined means including a detector and adjustable means for variably biasing the detector output to said control and suppressor grids, whereby the intermediate-frequency signal level at which said pentode is driven to cut-off may be selectively varied, and a single common B-supply connected to said radio-frequency circuits and to said intermediate-frequency circuits and to said pentode.

2. In a radio receiver, an intermediate-frequency circuit, an audio-frequency detector coupled to said intermediate-frequency circuit, a gated-beam pentode, means grounding the shield and screen of said gated-beam pentode, means applying a negative B-supply voltage to the cathode of said gated-beam pentode, means including a diode coupling the control and suppressor grids of said pentode to said intermediate-frequency circuit, a sharp cut-off pentode having its suppressor grid connected to the output of said gated-beam pentode, means grounding the cathode of said sharp cut-off pentode, means applying a positive B-supply voltage to the anode of said sharp cut-off pentode, and means connecting said detector to the control grid of said sharp cut-off pentode.

3. In a radio receiver, an intermediate-frequency circuit, an audio-frequency detector coupled to the output of said intermediate-frequency circuit, a gated-beam pentode and means including a rectifier coupling the control and suppressor grids of said gated-beam pentode to the output of said intermediate-frequency circuit, means grounding the shield and screen of said gated-beam pentode, means applying a negative B-supply voltage to the cathode of said gated-beam pentode, a relay including a winding coupled across the plate and screen of said gated-beam pentode, said relay further including normally open contacts, said pentode being biased to conduct and thus to close said relay contacts in the absence of intermediate-frequency carrier below threshold and to cut-off conduction in said gated-beam pentode and thus to open said relay contacts in the presence of intermediate-frequency carrier above threshold, and a gating pentode having a control-grid connection to said audio detector and a suppressor-grid negative-biasing connection including said relay contacts.

References Cited in the file of this patent

UNITED STATES PATENTS

| | | |
|---|---|---|
| 2,220,165 | Malter | Nov. 5, 1940 |
| 2,533,543 | Young | Dec. 12, 1950 |

OTHER REFERENCES

Publication: "Gated Beam Tube," in Electronics, February 1950, pp. 82–85.